June 10, 1924.  
E. W. KOESER  
MACHINE FOR AND METHOD OF MAKING EGG CARTONS  
Filed April 20, 1923  11 Sheets-Sheet 1
1,497,100
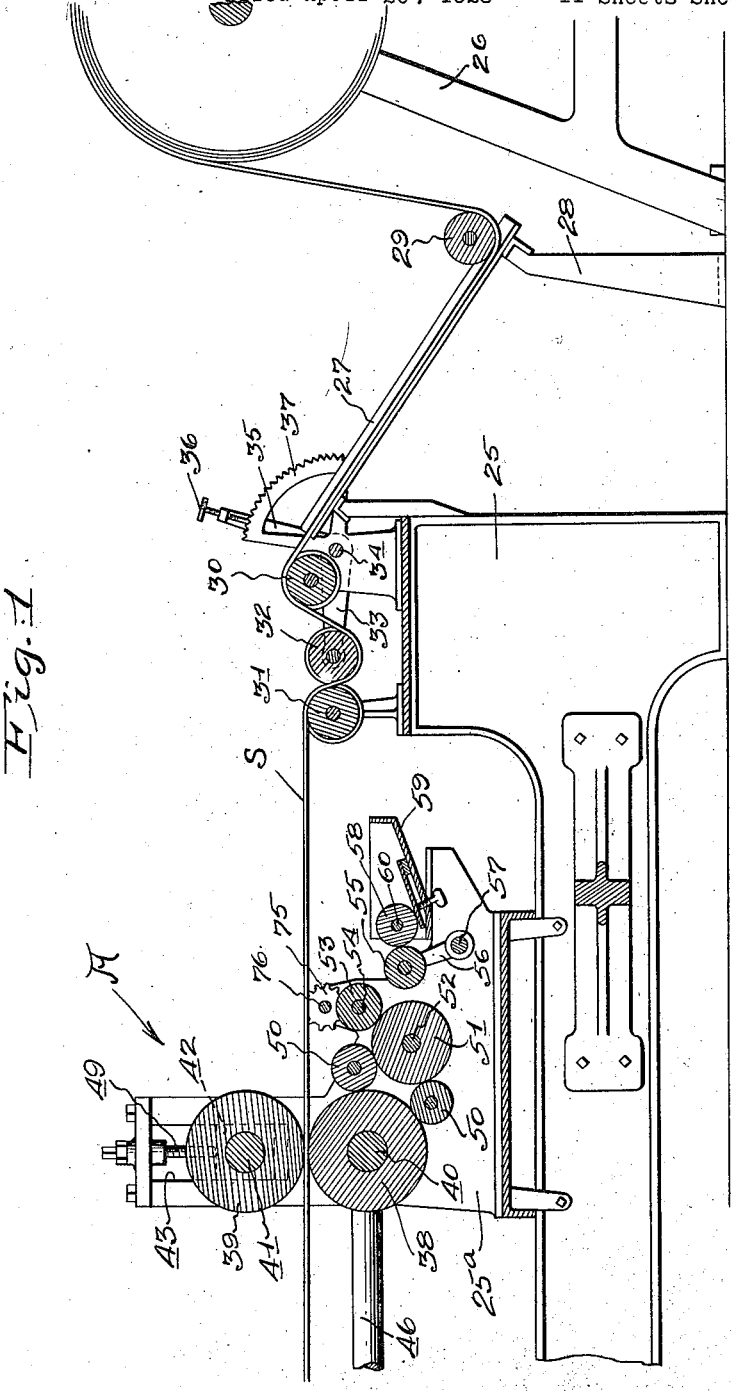
Inventor  
Earl William Koeser  
By Bradbury + Caswell  
Attorneys June 10, 1924.
E. W. KOESER
1,497,100
MACHINE FOR AND METHOD OF MAKING EGG CARTONS
Filed April 20, 1923   11 Sheets-Sheet 2
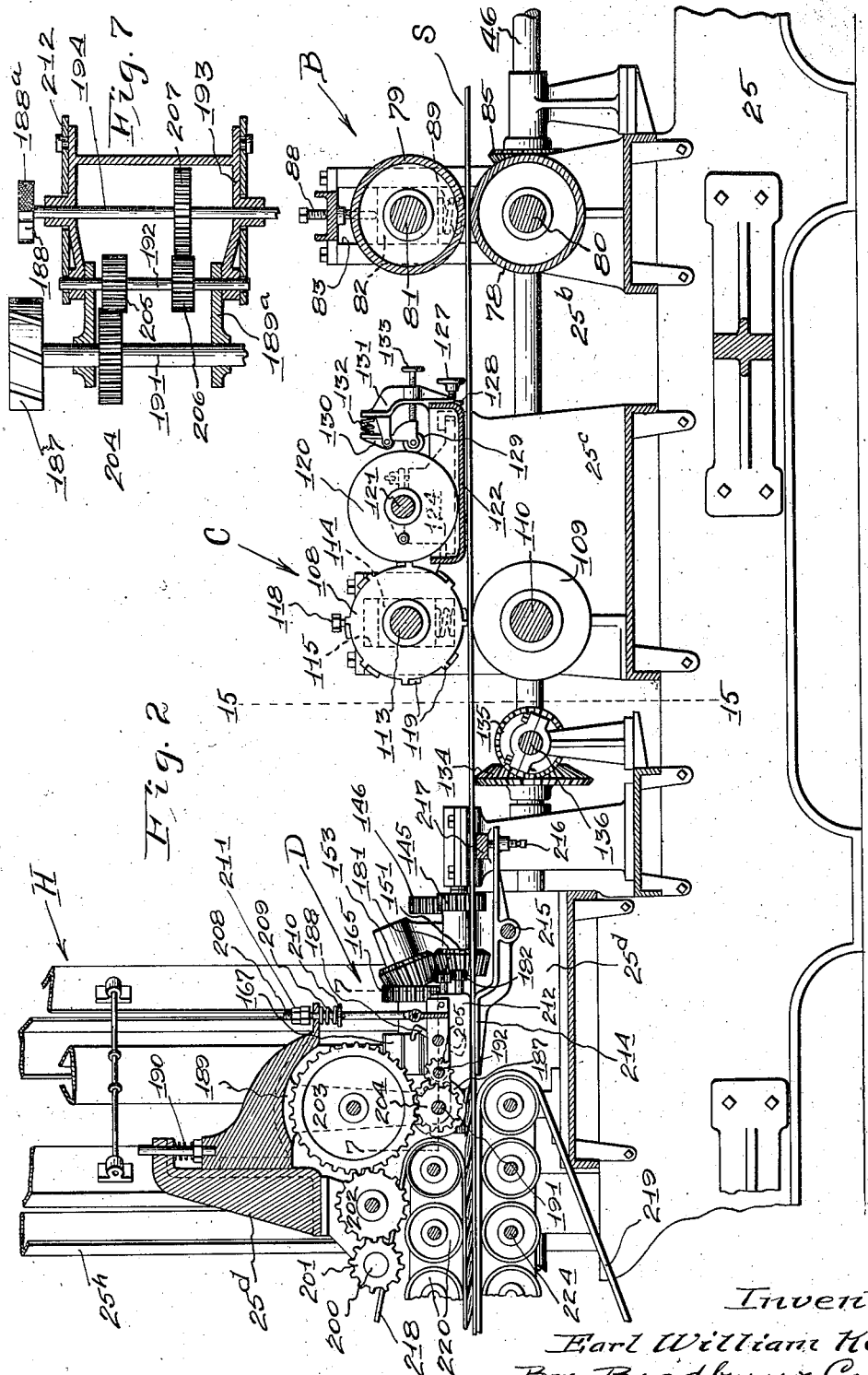
Inventor
Earl William Koeser
By Bradbury & Caswell
Attorneys June 10, 1924.
E. W. KOESER
1,497,100
MACHINE FOR AND METHOD OF MAKING EGG CARTONS
Filed April 20, 1923    11 Sheets-Sheet 3
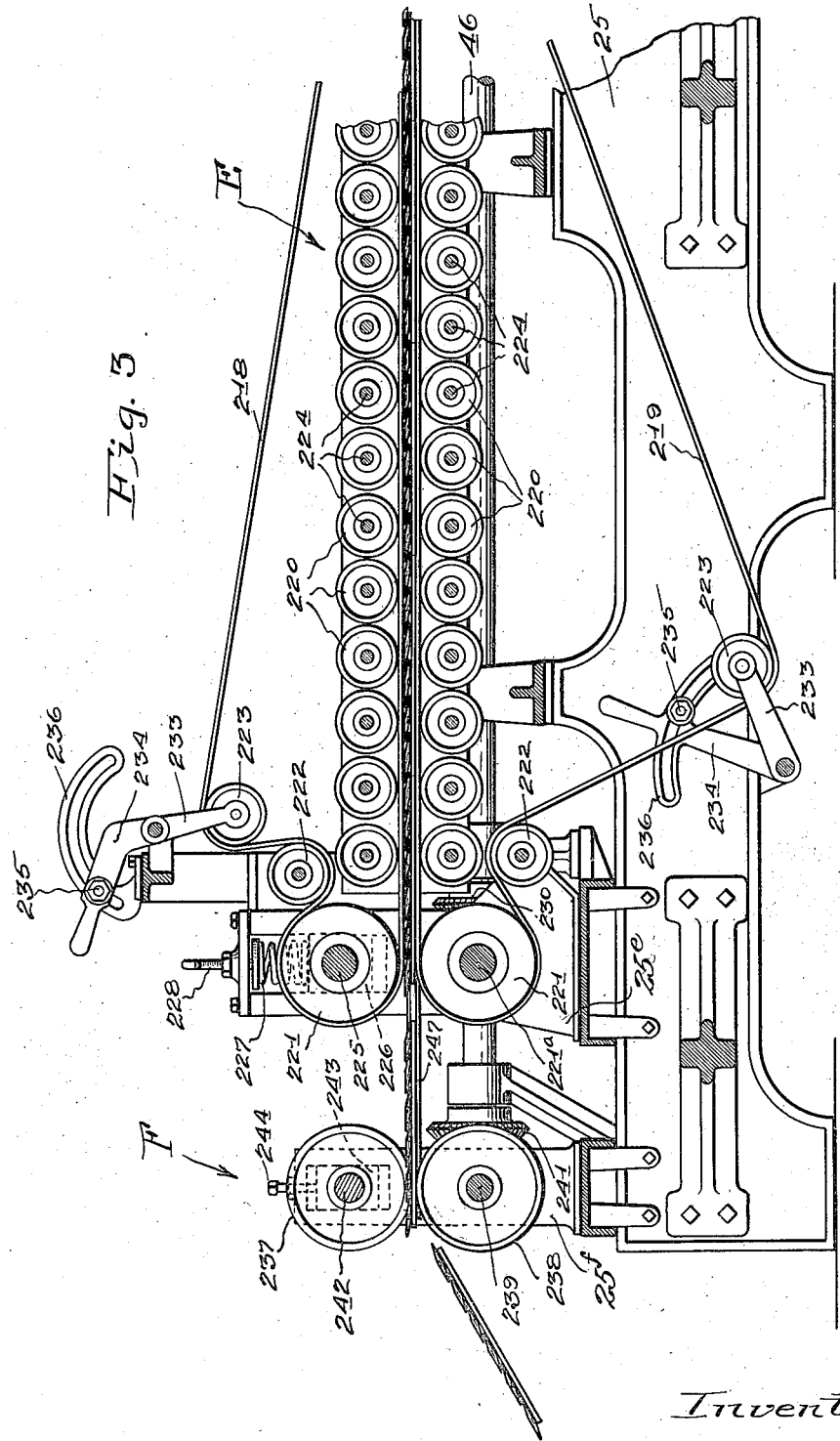
Inventor
Earl William Koeser
By Bradbury & Caswell
Attorneys June 10, 1924.  
E. W. KOESER  
1,497,100  
MACHINE FOR AND METHOD OF MAKING EGG CARTONS  
Filed April 20, 1923  11 Sheets-Sheet 4
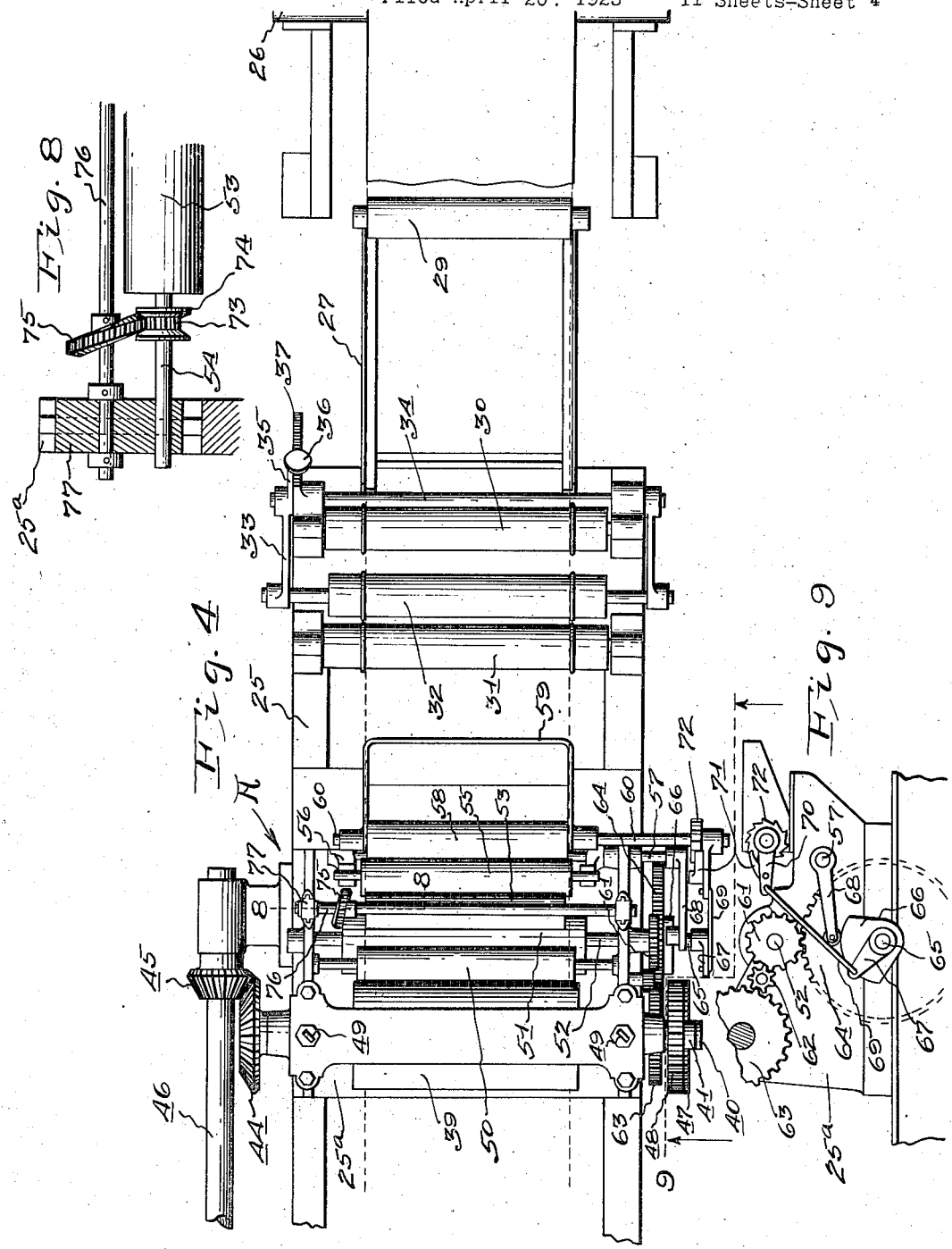
Inventor  
Earl William Koeser  
By Bradbury + Caswell  
Attorneys

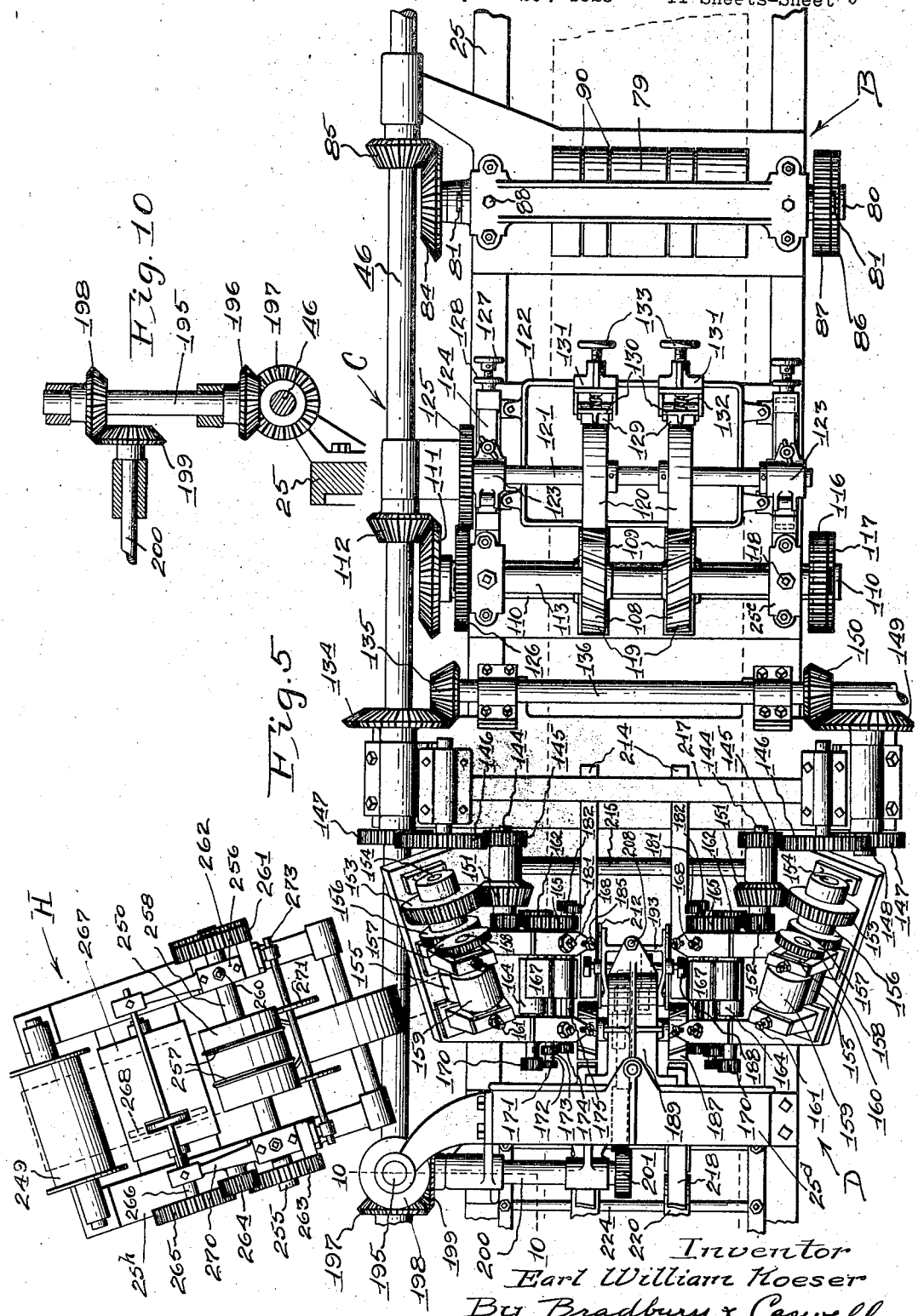

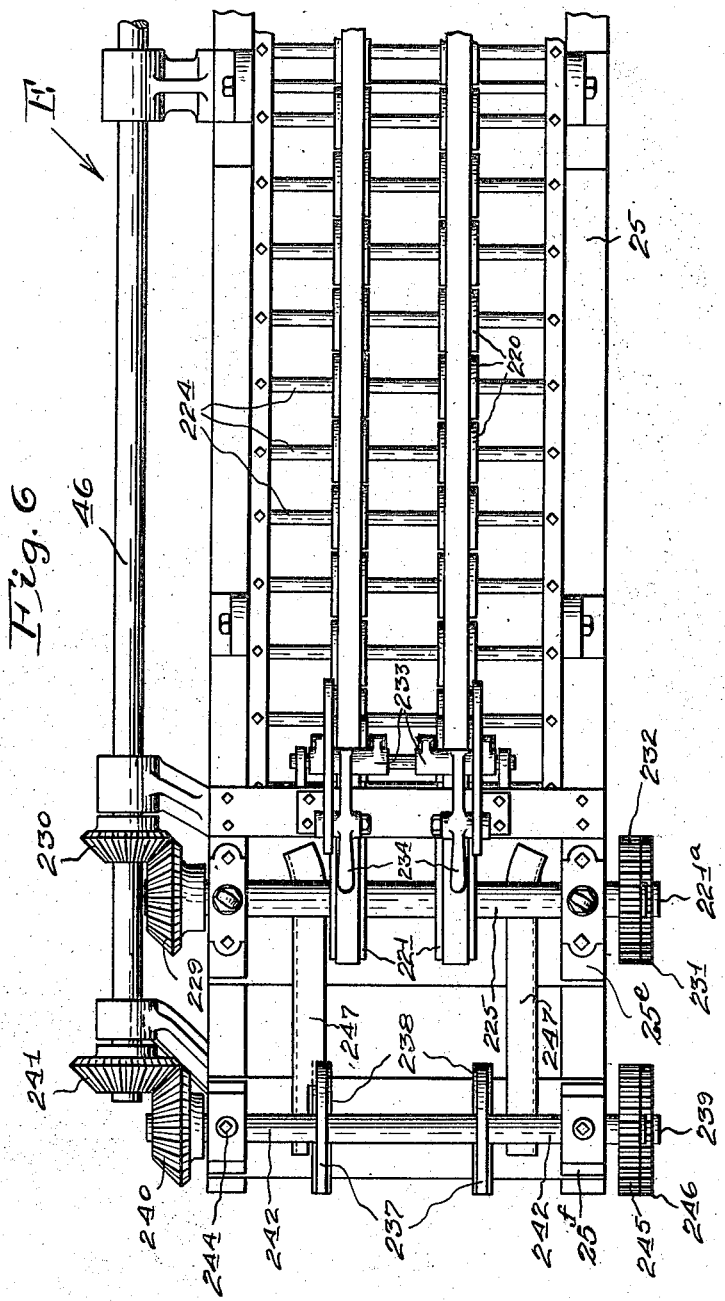

June 10, 1924. 1,497,100
E. W. KOESER
MACHINE FOR AND METHOD OF MAKING EGG CARTONS
Filed April 20, 1923    11 Sheets-Sheet 7
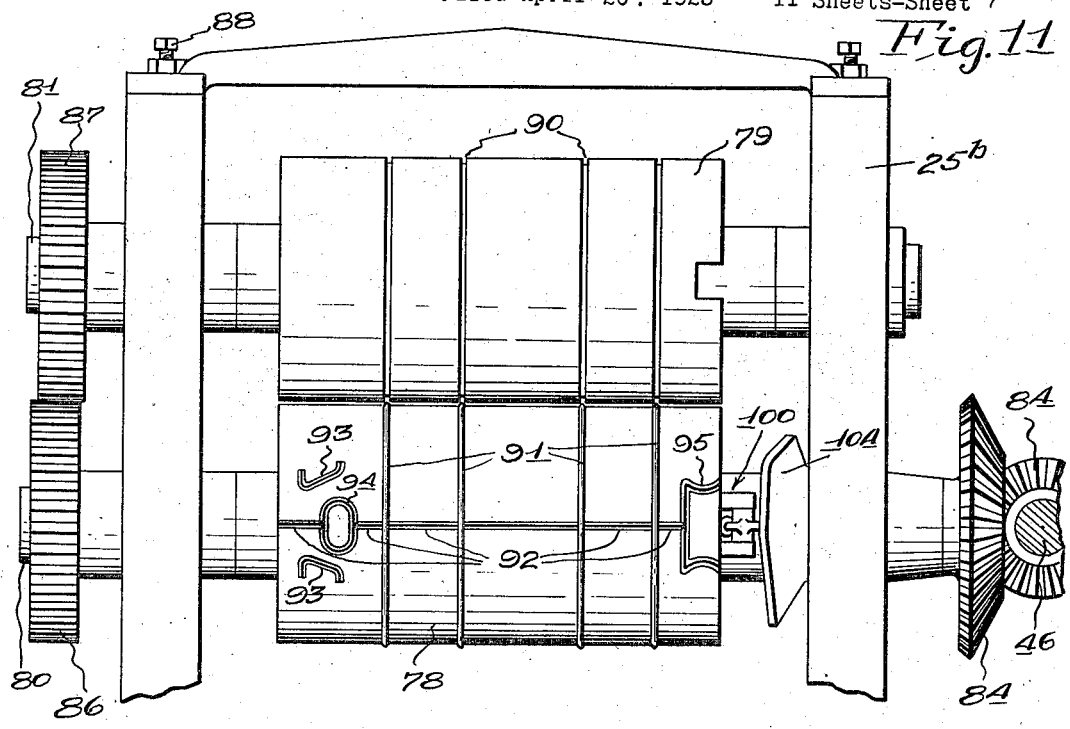
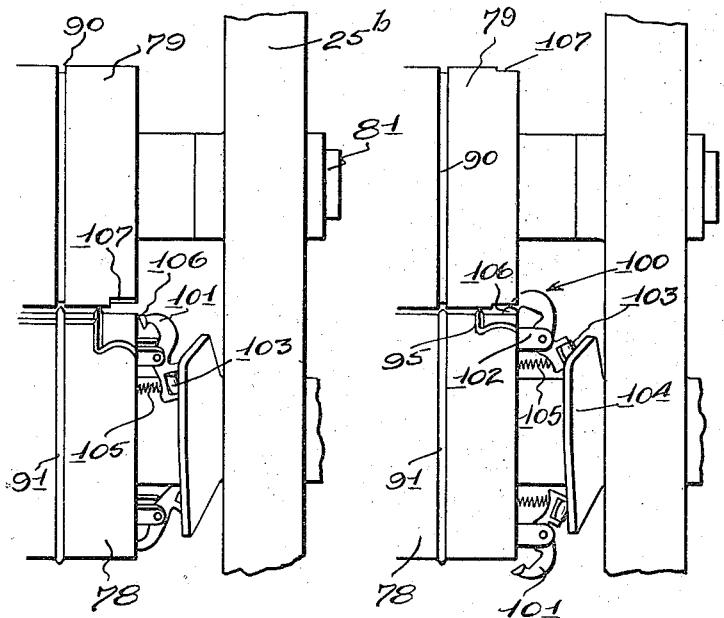
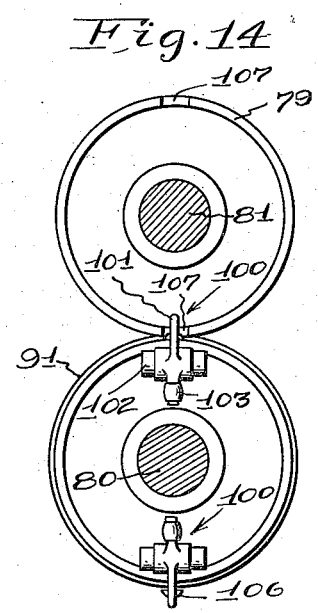
Inventor
Earl William Koeser
By Bradbury & Caswell
Attorneys

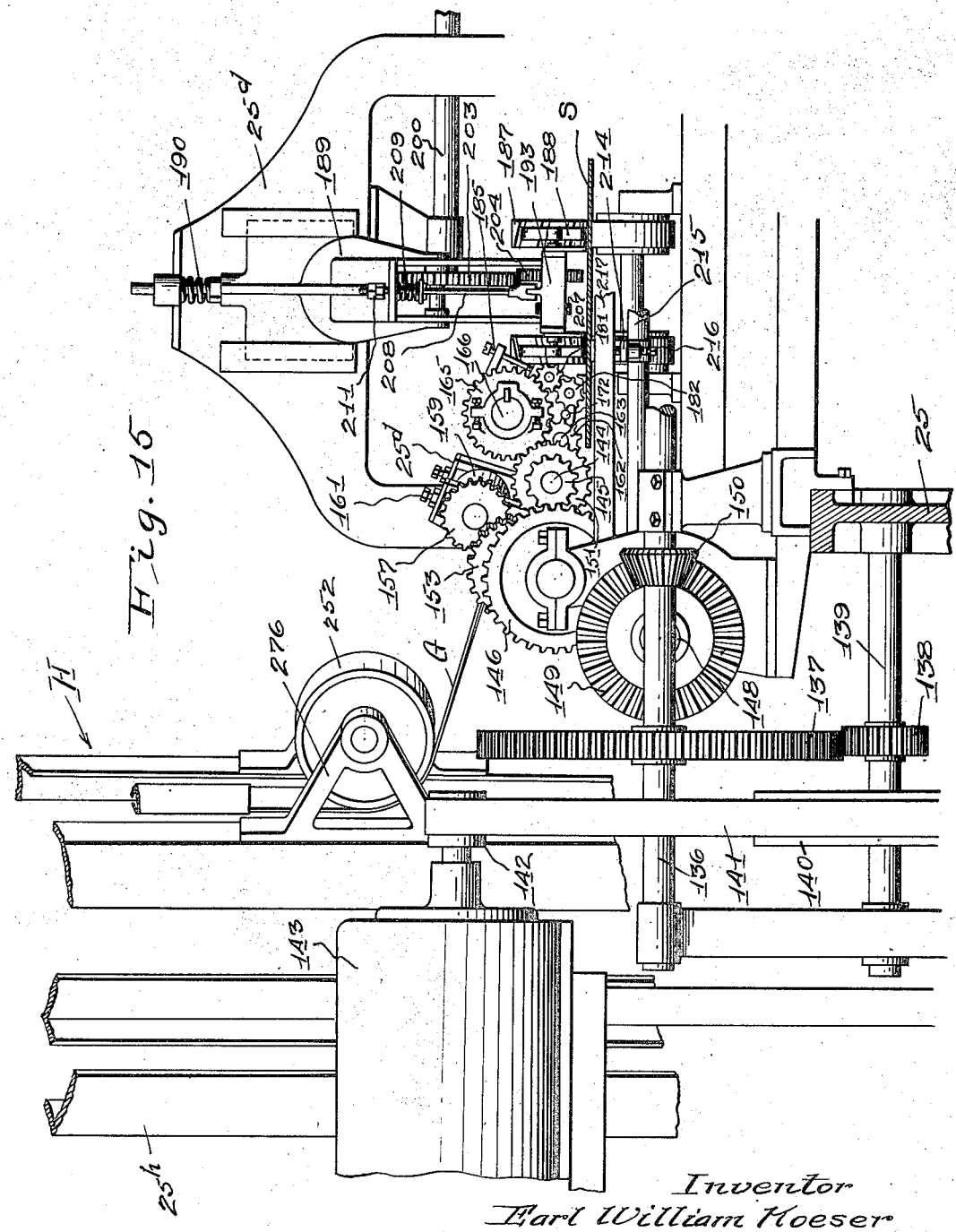

June 10, 1924.
E. W. KOESER
1,497,100
MACHINE FOR AND METHOD OF MAKING EGG CARTONS
Filed April 20, 1923    11 Sheets-Sheet 9
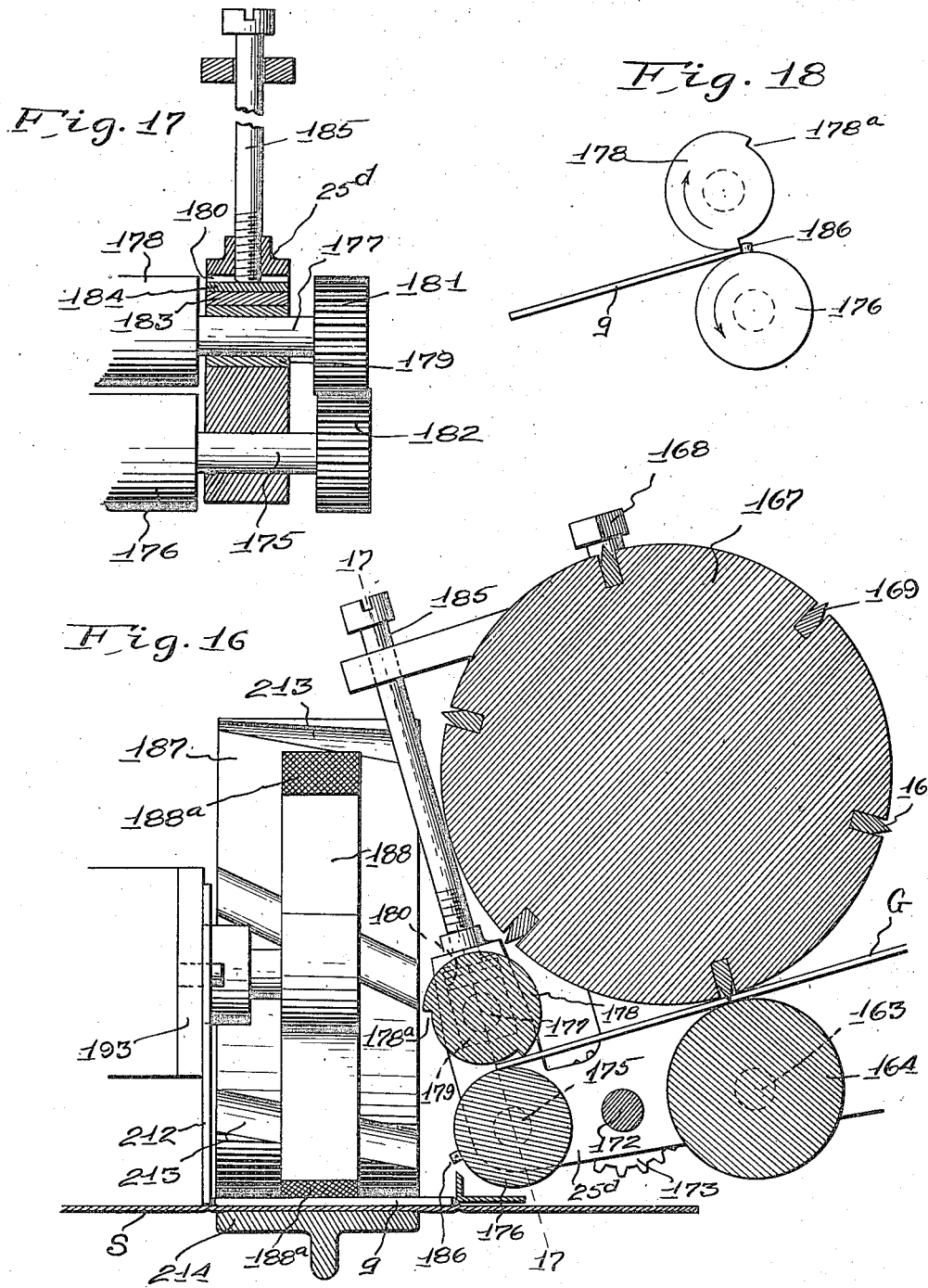

June 10, 1924.
E. W. KOESER
MACHINE FOR AND METHOD OF MAKING EGG CARTONS
Filed April 20, 1923   11 Sheets-Sheet 10
1,497,100
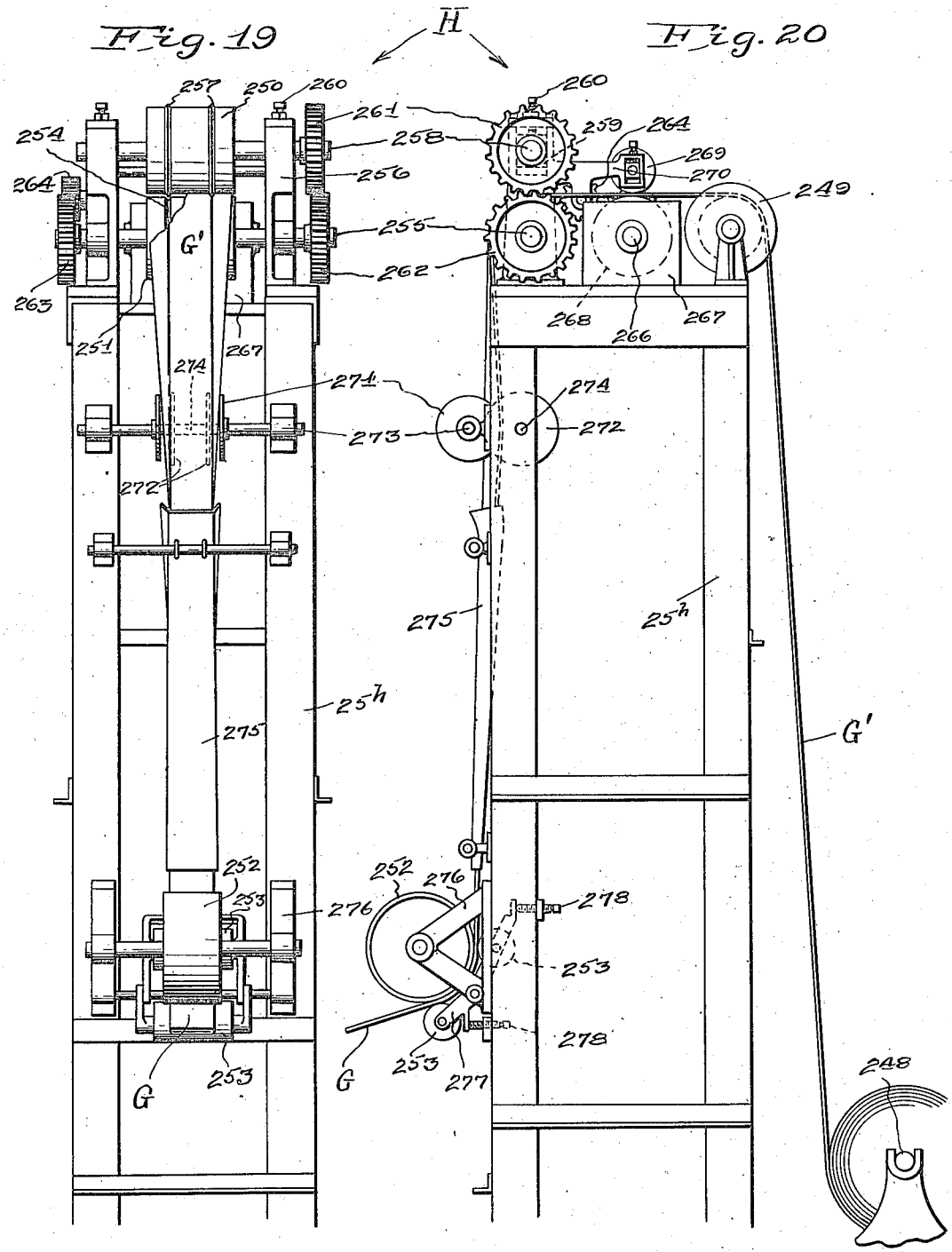

June 10, 1924.
E. W. KOESER
MACHINE FOR AND METHOD OF MAKING EGG CARTONS
Filed April 20, 1923    11 Sheets-Sheet 11
1,497,100
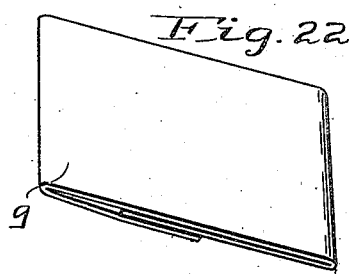
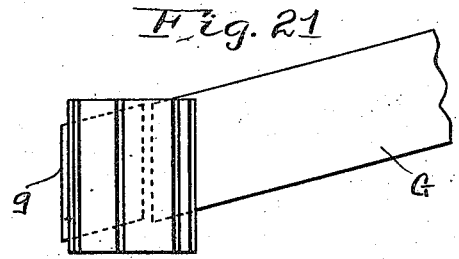
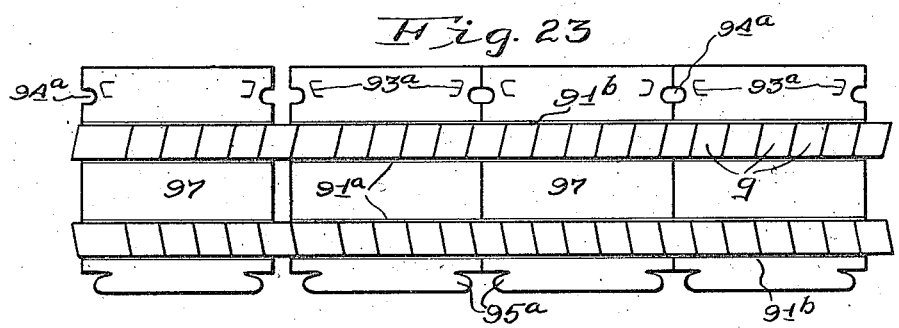
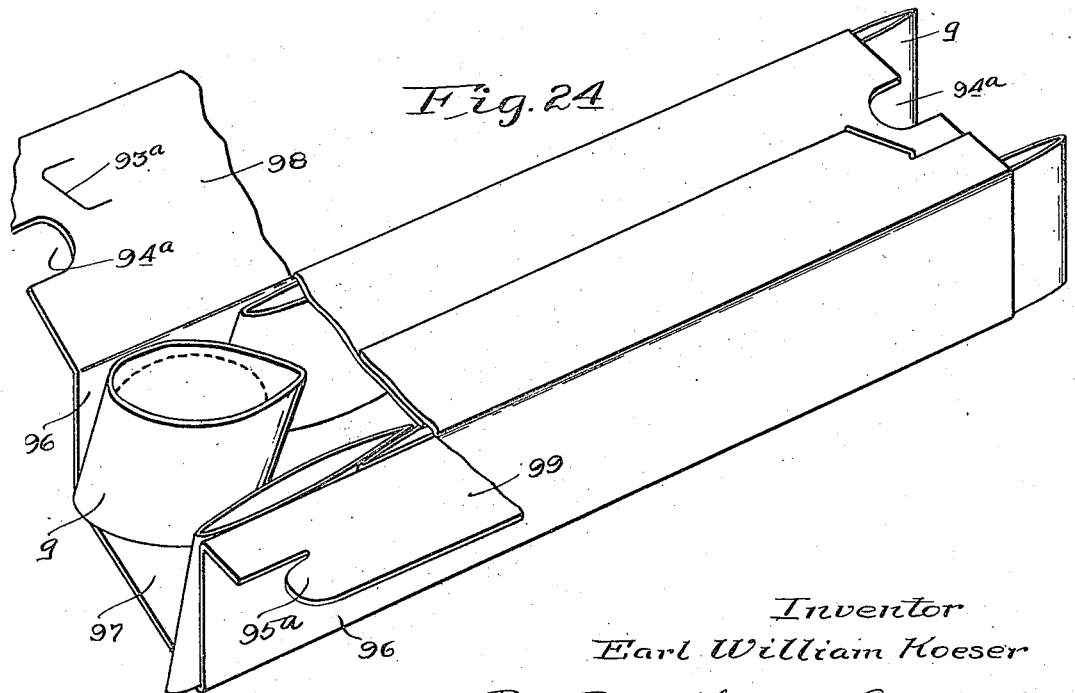
Inventor
Earl William Koeser
By Bradbury & Caswell
Attorneys Patented June 10, 1924.

1,497,100

UNITED STATES PATENT OFFICE.

EARL WILLIAM KOESER, OF MINNEAPOLIS, MINNESOTA.

MACHINE FOR AND METHOD OF MAKING EGG CARTONS.

Application filed April 20, 1923. Serial No. 633,421.

*To all whom it may concern:*

Be it known that I, EARL WILLIAM KOESER, a citizen of the United States, residing at Minneapolis, in the county of Hennepin and State of Minnesota, have invented a new and useful Machine for and Method of Making Egg Cartons, of which the following is a specification.

My invention relates to improvements in machine for and method of making egg cartons.

Its object is to provide an efficient and durable machine of this kind adapted to receive a main strip of paper board, also a pair of opposed supplementary strips of similar material and to print the main strip, crease the same longitudinally, cut said strip laterally to form carton blanks, form pockets from the supplementary strips, and affix said pockets to the carton blanks.

A further object is to provide in a machine of this kind means for advancing a strip of paper board therethrough, mechanism for creasing and partially cutting the same to form a series of connected carton blanks, mechanism for applying and affixing pockets to said blanks, and means for detaching said blanks, one from the other, prior to the delivery thereof from said machine.

Another object is to provide a machine of this nature adapted to feed a main strip of paper board therethrough and supplied with mechanism adapted to form pockets from opposed strips of paper board and affix said pockets in parallel rows upon the main strip, the pockets in each row being placed uniformly in overlapping relation with respect to each other.

A further object is to provide in a machine of this kind, through which a main strip of paper board is fed, means for applying glue or the like to said strip in limited areas in certain zones, mechanism for supplying pockets to said strip, means for uniformly placing the pockets upon said strip to properly engage said glued areas and means for holding said pockets against the strip as the same advances through the machine.

Another object is to furnish a machine of this nature designed to receive a strip of paper board and supplied with means for creasing and cutting the same, means for applying glue thereto, mechanism for placing pockets upon the strip and means for affixing the pockets to the strip, said creasing and cutting means and said affixing means serving also to advance the strip through the machine.

With the foregoing and other objects in view, which will appear in the following description, the invention resides in the novel combination and arrangement of parts and in the details of construction hereinafter described and claimed.

In the drawings, a longitudinal central section of my improved machine is illustrated in Figs. 1, 2, and 3, said figures showing, in order, portions of the machine from front to rear; Figs. 4, 5 and 6 are respectively views in plan of the portions of the machine illustrated in Figs. 1, 2, and 3; Fig. 7 is a detail sectional view taken on the line 7—7 of Fig. 2 and shows the justifier, the mounting therefor and driving mechanism for turning the same; Fig. 8 is a detail sectional view taken on the line 8—8 of Fig. 4; Fig. 9 is a detail view, partly in section, taken on the line 9—9 of Fig. 4; Fig. 10 is a detail sectional view taken on the line 10—10 of Fig. 5; Fig. 11 is a view in elevation illustrating the male and female dies for creasing the main strip and cutting the same to form a connected series of carton blanks; Figs. 12 and 13 are similar views in detail showing particularly the strippers and actuating cams therefor; Fig. 14 is an end elevation illustrating said dies and strippers; Fig. 15 is an enlarged transverse sectional view, in detail, taken on the line 15—15 of Fig. 2; Fig. 16 is a view, in detail, illustrating the mechanism for cutting pockets from a tubular strip and the rolls for delivering said pockets to the main strip, also the justifier for correcting the positions of said pockets upon said strip; Fig. 17 is a detail sectional view taken on the line 17—17 of Fig. 16; Fig. 18 is a detail view showing the delivery rolls in the act of discharging a pocket therefrom; Figs. 19 and 20 are respectively front and side elevations of one of the towers and mechanism thereon for forming a tubular structure from a strip of paper board; Fig. 21 is a diagrammatical view of the cutter roll and a section of a tubular structure therebeneath; Fig. 22 is a perspective view of one of the pockets; Fig. 23 is a plan view illustrating the product of my machine and Fig. 24 is a perspective view thereof in folded form.

Referring to the accompanying drawings, I have used the reference numeral 25 to indicate the main frame of my machine, upon which is carried mechanism A for printing a main strip S of paper board, mechanism B for creasing and cutting the same to form carton blanks, mechanism C for gluing said strip, means D for placing pockets g, in rows, thereon, mechanism E for sealing said pockets on said strip, and take-off means F for breaking the carton blanks from the main strip, all of said devices being propelled and co-ordinated in operation to advance the strip of paper board through the machine.

Near the forward end of the machine, (Fig. 1), I provide a reel 26 upon which a roll of paper board is placed. An upwardly inclined guide 27, mounted at its upper end on the frame 25 and at its lower end on a standard 28, is supplied at said lower end with a guide and straightening roller 29. On the frame 25 adjacent to the upper end of the guide 27 are three flanged guide rollers 30, 31, and 32. The rollers 30 and 31 are journaled on the frame 25, while the roller 32 is journaled in arms 33 fixed to a rock shaft 34 on said frame. One of said arms 33 carries a lever 35, which is supplied with a set screw 36 arranged to engage a notched quadrant 37 on the frame 25. A roll of paper board on the reel 26 unrolls from the top, the strip being passed beneath the roller 29, through the guide 27, over the rollers 30 and 31 and under the roller 32. Said latter roller may be shifted by adjusting the lever 35 to straighten or eliminate the bend in a strip under various conditions. Said roller 29 also serves, together with the guide 27 and the rollers 30, 31 and 32, in introducing the strip, in proper lateral position, into the machine.

The strip of paper board S passes from the roller 31 between a plate roll 38 and a pressure roll 39 of the printing mechanism A. Said plate roll 38 is mounted on a shaft 40 journaled in a subframe 25ª and the pressure roll is mounted on a shaft 41 journaled in blocks 42 slidable in ways 43 in said subframe. A bevel gear 44 at one end of the shaft 40 meshes with a companion gear 45 on a power shaft 46 extending throughout the greater part of the length of the machine. On the opposite end of said shaft 40 is a spur gear 47, which meshes with a companion gear 48 on the shaft 41. Thus, it will be seen that power applied to the plate roll is transmitted in the opposite direction to the pressure roll. Bolts 49 in the subframe 25ª, arranged to bear upon the blocks 42, serve to regulate the pressure of the roll 39 against the plate roll 38. Composition rollers 50 revoluble in the subframe 25ª bear against the plate roll 38 and against a distributing roller 51 on a shaft 52 in said subframe. A vibrator roller 53 on a shaft 54 engages said distributing roller constantly, while a roller 55, carried by arms 56 on a rock-shaft 57, oscillates between the distributing roller 51 and an ink roller 58, in an ink well 59, mounted on a shaft 60 passing therethrough. A driving gear 61, on the shaft 52 of the distributing roller, meshes with an idler gear 62, which in turn meshes with a gear 63 on the shaft 41 of the plate roll. Said driving gear 61 also meshes with a larger gear 64 on a shaft 65 carrying a cam 66 and an arm 67. The cam 66 actuates a roller arm 68 on the oscillating roller shaft 57 and the arm 67 is connected through a link 69 with an arm 70 loosely mounted on the shaft 60 of the ink roller 58. A dog 71 on said arm 70 engages a ratchet wheel 72 fixed to said shaft 60 and, upon each oscillation of the arm 70, turns the inking roller 58. A gear 73 (Fig. 8), formed between annular shoulders 74, is fixed to the vibrator roller shaft 54 and meshes with a gear 75 obliquely arranged upon a shaft 76 revoluble in vertically slidable blocks 77 in the subframe 25ª, but secure against longitudinal movement therein. Rotation of the vibrator roller 53, due to its frictional contact with the distributing roller 51 turns the gears 73 and 75, and said gears operate to reciprocate said vibrator roller longitudinally with respect to said distributing roller.

Near the printing mechanism A, and on the main frame 25, I have placed a subframe 25ᵇ in which male and female creasing and cutting dies 78 and 79 are mounted. The male die 78 (Fig. 11) consists of a roll mounted upon a shaft 80 journaled in said subframe 25ᵇ, while the female die 79 comprises a roll mounted upon a shaft 81, journaled in blocks 82, slidable in ways 83 in the subframe 25ᵇ. The shaft 80 is supplied at one end with a bevel gear 84 meshing with a companion gear 85 on the power shaft 46. On the opposite end of said shaft 80 is a spur gear 86, which meshes with a companion gear 87 on the shaft 81. Power applied to the shaft 80 is transmitted to the shaft 81 in the reverse direction through said spur gears. Set bolts 88 threaded in the subframe 25ᵇ above the blocks 82 operate against the action of springs 89 beneath said blocks and secure the female die 79 in desired proximity to the male die 78. Annular grooves 90 in the roll 79 co-operate with annular ribs 91 on the roll 78 and form longitudinal creases in the strip of paper board passing from the printing mechanism A and between said rolls 78 and 79. Longitudinally aligned cutting elements 92 on opposite sides of the roll 78 are adapted to cut the main strip laterally, but not sever said strip. Thus, it will be seen that, upon each revolution of the die rolls 78 and 79, two connected carton blanks are formed. Upon opposite sides of the roll 78 and at one end thereof are cutting elements 93 and 94. The former being designed to cut slits or locks 93ª (Figs. 23 and 24) in the cover flaps 98 of the blanks, and the latter to cut thumb holes 94ª therein. On the other end and upon opposite sides of said roll 78 are cutting elements 95 designed to form loops 95ª on the cover flaps 99 of the carton blanks. The inner ribs 91 form creases 91ª upon which the side member 96 of said blanks are turned with respect to the bottoms 97 thereof. The outer ribs 91 form creases 91ᵇ upon which the cover flaps 98 and 99 of said blanks are turned with respect to the sides 96 thereof. These creases provide for readily shaping the cartons for use. To avoid difficulty in later severing the carton blanks and to remove the clippings from the cutting elements 95 at cutting position, I provide strippers 100. Each stripper comprises, a radially disposed lever 101 pivoted at its center in a bearing 102 on the end of the roll 78. A roller 103, on the inner end of the lever, rides upon the face of a stationary cam 104 on the subframe 25ᵇ, said roller being yieldingly pressed against said cam by a spring 105 interposed between the roll 78 and said lever 101. A grip 106 on the lever 101 is formed to press a clipping, from the cutting element 95, against the roll 78 and thus hold the same until released by the action of the cam 104 (Fig. 13). Said cam is designed to withhold the grip 106 from the roll 78 until said grip reaches a position above the strip of paper board, whereupon said grip is passed through an opening 107 in the roll 78 and against that portion of the strip to be severed by the cutting element 95.

A strip of paper board having been printed by the mechanism A and creased and cut between the rolls 78 and 79 is advanced by the action of both to the gluing mechanism C. This mechanism includes placer rolls 108 and supporting rolls 109 mounted on a shaft 110 journaled in a subframe 25ᶜ and driven through a bevel gear 111 thereon from a companion gear 112 on the power shaft 46. The placer rolls 108 are carried on a shaft 113 journaled in boxes 114 slidable in ways 115 in said subframe. Said shaft 113 is supplied with a spur gear 116 meshing with a spur gear 117 on the end of the shaft 110 opposite the power shaft 46 and is propelled through said gears in a reverse direction with respect to the shaft 110. Set bolts 118 in the subframe 25ᶜ bearing upon the blocks 114 are adjusted to secure the desired pressure of the placer rolls 108 against the strip of paper board thereunder. Lugs or spotters 119, projecting from the peripheries of the placer rolls, bear upon the strip in the two zones between the crease lines 91ª and 91ᵇ, said spotters being inclined so as to apply glue in oblique bands or areas in said zones. Gluing rollers 120 on a shaft 121 dip into a glue-pot 122 on the subframe 25ᶜ. Said shaft 121 is removably mounted in bearings 123 on blocks 124 slidable in said subframe and is driven through a spur gear 125 thereon, which meshes with a spur gear 126 on the placer roll shaft 113. The blocks 124 are adjusted by manipulation of set screws 127, threaded in the subframe 25ᶜ and bearing against said blocks, and are secured in selected positions by hand nuts 128 on said set screws. The adjustability of the blocks 124 provides for shifting the gluing rollers 120 with respect to the placer rolls 108. Stripper rollers 129, one for each gluing roller, are carried on arms 130 pivotally mounted upon brackets 131 secured to the gluing pot 122. Each arm has a spring 132, acting against one end thereof, to withdraw its stripping roller 129 from the gluing roller. Bearing against the opposite end of said arm is a hand screw 133, by which said roller is pressed against the gluing roller. The adjustment of the hand screws 133 determines the quantity of the glue to be presented to the spotters 119 on the placer rollers 108.

The power shaft 46, above mentioned, is supplied near the middle thereof with a driving gear 134 meshing with a bevel gear 135 on a shaft 136 passing transversely through the machine. Said shaft 136 (Fig. 15) has a large spur gear 137 thereon meshing with a small spur gear 138 on a counter shaft 139 therebeneath. A pulley 140, on this counter shaft, carries a belt 141, which passes over the driving pulley 142 of a motor 143.

Passing from the gluing mechanism C, wherein a strip is spotted with glue in the zones forming the sides of the carton blanks, said strip proceeds toward the following mechanism for applying pockets to said glued zones. This mechanism includes opposed duplicate combinations of parts, each being actuated through a stub shaft 144 turned by a gear 145, propelled through an idler gear 146 from a driving gear 147. On one side of the machine, the driving gear 147 is mounted upon the power shaft 46, while on the other side of the machine, said gear is mounted on a stub shaft 148 having a bevel gear 149 thereon in mesh with a companion gear 150 on the transverse power shaft 136. To each stub shaft 144, above mentioned, I apply a bevel gear 151 and a spur gear 152, the former meshing with a bevel gear 153 on a suitably journaled shaft 154 inclined inwardly and downwardly toward the rear of the machine. Said shaft 154 carries a feed roller 155 and a spur gear 156 which meshes with a similar gear 157 on a shaft 158 carrying a second and coacting feed roller 159. Said shaft 158 is journaled in blocks 160 slidable in vertical ways in members of a subframe 25ᵈ, said blocks being depressed, by means of set screws 161 in said members to vary the pressure between said feed rollers 155 and 159. The spur gear 152 on each shaft 144 meshes with a gear 162 on a suitably journaled shaft 163 carrying thereon a lower cutter roll 164. Said gear 162, in turn, meshes with a spur gear 165 angularly adjustable on a shaft 166 having an upper cutter roll 167 formed thereon. This shaft 166 is journaled in blocks slidable in ways (not shown) in the subframe 25$^d$, said blocks being depressed by means of set screws 168 in said subframe to attain the desired pressure of cutting blades 169, seated in the periphery of said upper roller, against the lower cutter roll 164. Upon the end of the lower cutter roll shaft 163, opposite the gear 162, is a spur gear 170 which meshes with a small gear 171 on an idler shaft 172 carrying a larger gear 173. Said larger gear 173 meshes with a spur gear 174 on a shaft 175 journaled in the subframe and having a lower delivery roll 176 formed thereon. A shaft 177 formed with an upper delivery roll 178 thereon is journaled in blocks 179 slidable in ways 180 in the subframe 25$^d$ (Figs. 16 and 17) and carries a spur gear 181 meshing with a similar gear 182 on the end of the lower delivery roll shaft 175 opposite said gear 174. Above each block 179 is a yielding shim 183 having a cover plate 184 therefor, against which a set screw 185 bears. These set screws seat the blocks 179 in the ways 180 and vary the pressure of the upper delivery rolls 178 against the pockets passing between said rolls and the rolls 176 therebeneath. The pockets referred to are sections cut from a flattened tubular structure G, formed by twin devices H (Figs. 19 and 20), and fed to the cutting rolls 164 and 167 by the feeding rollers 155 and 159. Fig. 16 illustrates the relative positions of the cutter rolls and delivery rollers. A tubular structure G fed from the feeding rollers 155 and 159, passes between said cutter rolls and delivery rollers. The cutting blades 169 in the roll 167 are equally spaced and so arranged as to sever the tubular structure, as the end thereof passes between the delivery rollers 176 and 178, thus forming a pocket or cell g for delivery to one of the gummed zones, on the main strip of paper-board, passing in front of said delivery rollers. In this connection it will be noted that a longitudinal depression 178$^a$ in each roller 178 provides a free opening between the delivery rollers 176 and 178 to receive the forward side of a pocket as it is severed from the tubular structure G. The gearing above described, for driving the delivery rollers is geared up to increase the carrying speed thereof with respect to the speed of the feeding rollers 155 and 159. Progressing from the position shown in Fig. 16, the delivery rollers 176 and 178, grip the pocket, carry the same forward and deliver it upon the main strip in position overlapping the preceding pocket. Pins 186 in the lower roller 176 are located so as to abut against the rear side of a pocket, as the same passes from the grip of the rollers. These pins throw the pocket forward and the rear side thereof downward, thus accelerating the movement of said pocket in its fall to the main strip S. Said pins 186 mesh with the depressions 178$^a$ in the upper delivery rollers 178 and thereby avoid interference with the raised portions of said rollers.

To correct the positions of the pockets g upon the carton blanks, I supply rotary gauges 187 and co-operating rotary justifiers 188, both co-ordinated with the dies 78 and 79 and the gluing mechanism C and adapted to space the pockets equally and in proper positions upon the gummed carton blanks. A yoke 189 slidable vertically in the subframe 25$^d$ and yieldingly depressed by a spring 190 carries a transverse shaft 191 (Fig. 7), the rotary gauges 187 being mounted upon the opposite ends thereof in positions to roll upon the rows of pockets delivered to the main strip S. Mounted in forward extensions 189$^a$ of the yoke 189 is a shaft 192 and tiltably mounted on said shaft is a justifier frame 193. A shaft 194, journaled in said frame, carries the justifiers 188 at the opposite ends thereof, each justifier being aligned with its companion rotary gauge 187. Power for turning the gauges 187 and justifiers 188 is procured from the power shaft 46 as follows: A vertical idler shaft 195 (Fig. 10) journaled in the frame, is supplied at its lower end with a bevel gear 196 meshing with a bevel gear 197 on said power shaft and at its upper end with a bevel gear 198 meshing with a bevel gear 199 on a horizontal shaft 200 reaching over the machine. A spur gear 201 on said horizontal shaft meshes with an idler gear 202 mounted in the subframe 25$^d$ and, in turn, meshing with a large spur gear 203 journaled in the yoke 189. Said gear 203 meshes with a gear 204 on the gauge shaft 191 and said gear 204, in turn, meshes with a gear 205 on the shaft 192 pivotally joining the justifier frame 193 with the yoke extensions 189$^a$. A second gear 206 on said shaft 192 meshes with a driving gear 207 on the justifier shaft 194. This gearing from the power shaft 46 to the gauges 187 and justifiers 188 is designed so that the peripheral speed of the former is equal to the speed of the advancing carton blanks, while the speed of the latter is somewhat accelerated with respect thereto. Each justifier 188 comprises opposed arms, each being supplied with a trailing finger 188$^a$. A connecting rod 208, carrying a spring 209, interposed between the yoke 189 and a stop 210 on said rod, yieldingly depresses the justifier frame 193, the action of said spring being limited by stop nuts 211 on said rod. The movement of the delivery rollers 176 and 178 is timed so that each set discharges a pocket, when the justifiers have passed from vertical positions toward the horizontal. Floating guides 212 on the justifier frame 193 place the pockets $g$ laterally in their fall to the main strip S. In the next half revolution of the justifiers 188 the fingers 188a on the depending arms thereof, brush against said pockets and urge the same forward against the lower stop 213 in the rotary gauges 187. These stops 213 comprise grooves cut diagonally across the faces of the rotary gauges 187. Adjustable slides 214 under the main strip S and beneath the justifiers 188, support the main strip against pressure exerted by said justifiers. Each slide consists of a lever, pivoted on a shaft 215, and supplied at the forward end thereof with a set screw 216 bearing beneath a cross-piece 217 on the frame 25.

Carrying and sealing mechanism E receives the main strip S after the pockets $g$ are properly placed thereon. This mechanism comprises two sets of coacting endless belts 218 and 219. In each set, the adjacent runs of said belts form a yielding traveling grip for one of the zones on the strip bearing a row of pockets $g$. The belts in each set pass between opposed series of pressure rollers 220, over terminal pulleys 221, idler pulleys 222 and tightening rollers 223, the lower belts being extended forward beneath the rotary gauges 187 to support the strip S therebeneath. The pressure rollers 220 are carried upon shafts 224 journaled in the frame, the shafts upon which the upper series of rollers are mounted being yieldingly journaled in said frame. The lower terminal pulleys 221 are carried on a driving shaft 221a journaled in the subframe 25e, while the upper terminal pulleys 221 are carried on a shaft 225 journaled in blocks 226 slidable in said subframe and yieldingly depressed by springs 227, the tension of which is altered by means of adjusting screws 228 threaded in the subframe. The driving shaft 221a is propelled through a gear 229 meshing with a gear 230 on the power shaft 46 and turns the shaft 225 through intermeshing gears 231 and 232 respectively mounted on said shafts 221a and 225. The tightening rollers 223 are journaled in forks 233 pivoted on the frame and terminating in arms 234. These arms serve to shift said forks and fixed bolts 235 passing through said arms and adjacent slotted quadrants 236 secure the forks and maintain the desired tension in the belts 218 and 219. At the rear of the terminal pulleys 221 are upper and lower take-off rollers 237 and 238 between which the main strip S passes. The lower rollers 238 are mounted upon a shaft 239 journaled in the subframe 25f, said shaft being driven through a bevel gear 240 meshing with a bevel gear 241 on the power shaft 46. The upper rollers 237 are mounted upon a shaft 242 journaled in blocks 243 slidable vertically in said subframe and depressed by adjusting screws 244 threaded therein. Said upper shaft 242 is driven through a spur gear 245 by a spur gear 246 on said lower shaft 239. The carrying speed of the take-off rollers 237 and 238 is greater than the carrying speed of the coacting belts 218 and 219, whereby the carton blanks are severed from the connected series of blanks in the main strip, as said blanks issue from the pocket sealing mechanism E. Guides or channels 247 passing from said mechanism E to the take-off rollers 237 and 238 direct the severed cartons in their course toward the end of the machine.

The tubular structures G, from which the pockets $g$ are severed, are formed by mechanism in twin towers H, located upon opposite sides and near the middle of the machine. Each tower comprises a frame 25h. At the rear of the frame is a reel 248 upon which a roll of paper-board is placed. This board is unwound from the bottom of the roll, the strip G¹ passing upward and over a drum 249 on the top of the tower, thence horizontally forward between creasing rollers 250 and 251, thence downward between pressure rolls 252 and 253 and thence to the feeding rollers 155 and 159 on one side of the machine. The lower creasing roller 251 is formed with annular grooves 254 therein and is mounted upon a shaft 255 journaled in brackets 256 on the subframe 25h. The upper creasing roller 250 has annular ribs 257, upon the periphery thereof, said ribs being arranged to turn in said annular grooves 254. Said creasing roller 250 is mounted on a shaft 258 journaled in boxes 259, slidable vertically in the brackets 256, and depressed by adjusting screws 260 threaded in said brackets. As the tubular structure is fed into the machine by the feeding rollers 155 and 159, the creasing rollers 250 and 251 are turned by frictional contact of the strip G¹ therewith. Gears 261 and 262 connect the roller shafts 258 and 255 and a gear 263 on said lower roller shaft 255 meshes with an idler gear 264, in turn meshing with a gear 265 on a shaft 266 journaled in a glue box 267. A gluing wheel 268 on this shaft 266, dips into glue within the box 267 and supplies the same to the lower margin on one side of the strip G¹ as the same passes over said wheel. A guide wheel 269, adjustably mounted in arms 270 on the brackets 256, holds the strip in contact with gluing wheel 268. Guide wheels 271 and 272 mounted respectively on shafts 273 and 274, on the front of the tower, receive the margins of the strip G¹ and turn the same rearwardly on the crease lines formed by the rollers 250 and 251. A stationary guide or way 275 beneath said creasing rollers 250 and 251 turn the margins of said strip, one over the other, prior to the introduction of said strip to the pressure rolls 252 and 253, between which said overlapping margins are sealed together. The pressure roll 252 is journaled in brackets 276 on the tower, while the rolls 253, two in number, are journaled in yokes 277 pivoted on said brackets. Set screws 278 threaded in the frame 25ʰ and bearing against said yokes, provide for increasing or diminishing the pressure of the rolls 253 against the roller 252.

Changes in the specific form of my invention, as herein disclosed, may be made within the scope of what is claimed without departing from the spirit of my invention.

Having described my invention what I claim as new and desire to protect by Letters Patent is:

1. In a machine of the class described, a pair of endless belts arranged so that adjacent reaches thereof coact to carry carton blanks fed thereto, means for applying an adhesive material to certain portions of the carton blanks, means for delivering folded pockets upon the treated portions of said blanks, a gauge and a justifier coacting therewith and adapted to correct the position of said pockets upon said blanks, said carrying belts serving also as sealing elements to secure the pockets in corrected positions upon said blanks.

2. In a machine of the class described, a pair of endless belts arranged so that adjacent reaches thereof coact to carry carton blanks fed thereto, a series of supporting rollers on the inside of one reach of one belt and a series of yielding supporting rollers on the inside of the companion reach of the other belt, means for applying an adhesive material to certain portions of the carton blanks, means for delivering folded pockets upon the treated portions of said blanks, a gauge and a justifier coacting therewith, and adapted to correct the position of said pockets upon said blanks, said carrying belts serving also as sealing elements to secure the pockets in correct positions upon said blanks.

3. In a machine of the class described, means for advancing carton blanks therethrough, means for applying an adhesive material to certain portions of the carton blanks, means for overlapping the margins of a strip of paper and sealing the same together to form a flattened tubular structure, a cutter to sever sections or pockets from said structure, feeding rolls for moving the strip to form the same and also introduce it to said cutter, delivery rolls arranged to place the pockets upon the treated portion of said blanks, a yielding rotary gauge having stops in the periphery thereof and revoluble yielding justifiers having arms co-ordinated with the stops in said gauge and adapted to correct the positions of said pockets upon said blanks.

4. In a machine of the class described, means for advancing carton blanks therethrough, means for spotting said blanks with an adhesive material, a cutter, feeding rollers for introducing a flattened tubular stretcher to the cutter, said cutter being designed to sever sections or pockets from said structure, delivery rolls arranged to place the pockets upon the treated portions of said blanks, a gauge with stop therein, justifier having arms co-ordinated with the stops in said gauge and adapted to correct the positions of said pockets upon said blanks.

5. In a machine of the class described, means for advancing carton blanks therethrough, means for applying an adhesive material to certain portions of the carton blanks, means for delivering folded pockets upon the treated portions of said blanks, a gauge, a revoluble, yielding justifier having arms adapted to engage and shift the pockets against said gauge to correct the positions thereof and an adjustable support beneath the path of the carton blanks arranged to slidably support the blanks against said justifier.

6. In a machine of the class described, means for advancing carton blanks therethrough, means for applying an adhesive material to certain portions of the carton blanks, means for delivering folded pockets upon the treated portions of said blanks, a yielding rotary gauge having stops in the periphery thereof, arranged to ride upon the pockets on the moving blanks and a revoluble, yielding justifier having arms co-ordinated with the stops in said gauge and adapted to correct the position of said pockets upon said blanks.

7. In a machine of the class described, means for advancing carton blanks therethrough, means for applying an adhesive material to certain portions of the carton blanks, means for delivering folded pockets upon the treated portions of said blanks, a gauge above the moving blanks and a justifier co-ordinated with said gauge and adapted to correct the position of said pockets upon said blanks.

8. In a machine of the class described, means for advancing carton blanks therethrough, means for applying an adhesive material to certain portions of the carton blanks, means for delivering folded pockets upon the treated portions of said blanks, a rotary gauge having stops in the periphery thereof, yieldingly held against the pockets on the moving blanks and a revoluble, yielding justifier co-ordinated with said gauge and adapted to correct the position of said pockets upon said blanks.

9. In a machine of the class described, means adapted to carry carton blanks therethrough, means for applying glue to certain areas of said blanks, mechanism for shaping a strip of paper board into tubular form, gluing together the abutting margins of said strip and cutting the tube into sections to form pockets, said mechanism being co-ordinated with said carton advancing means and also with means for placing said pockets uniformly upon the treated areas of said blanks.

10. In a machine of the class described, means for advancing carton blanks therein, means for applying glue to said blanks, means for delivering pockets, comprising strips joined at their ends and folded on two lines of fold to the treated portions of the carton blanks, a revoluble gauge co-ordinated in movement with respect to the carton advancing means and a kicker adapted to co-operate with said gauge in placing the pockets uniformly upon said cartons.

11. In a machine of the class described, a frame, means thereon adapted to crease and partially cut a strip of paper board to form a connected series of carton blanks and to advance said strip in said machine, means for applying an adhesive substance to certain portions of the strip, mechanism for placing pockets upon said portions of said strip and means for pressing the pockets against the strip, said means also serving to carry the strip through the machine.

12. In a machine of the class described, a frame, means thereon adapted to crease and partially cut a strip of paper board to form a connected series of carton blanks and to advance said strip in said machine, means for applying an adhesive substance to certain portions of said strip, mechanism for placing pockets upon said portions of said strip, carrying means adapted to press the pockets against the strip and additional mechanism of increased carrying speed adapted to break the cartons from the strip and deliver the same, in spaced relation from the machine.

13. In a machine of the class described, means for placing pockets upon a strip of paper board therein, mechanism to carry the strip through the machine, said mechanism including means for printing the strip, means for creasing and cutting the strip to form a connected series of carton blanks, means for applying an adhesive substance to the strip prior to the application of said pockets thereto and means for pressing the pockets against the treated strip.

14. A machine including mechanism adapted to carry a series of carton blanks therethrough, means for applying liquid glue to certain areas of said blanks and means co-ordinated with said carrying mechanism for placing pockets upon the glue treated portions of said blanks.

15. In a machine of the class described, carrying means to advance carton blanks therethrough, means for applying glue to the carton blanks, mechanism for folding the margins of a strip of paper board together and gluing the same to form a flattened tubular structure and a knife for cutting sections or pockets from said tube, delivering mechanism arranged to feed said pockets upon the treated portions of said blanks, said carrying means being further adapted to seal said pockets upon the blanks.

16. In a machine of the class described, means for carrying carton blanks therethrough, means for feeding pockets upon the carton blanks and means for securing said pockets to said blanks.

17. In a machine of the class described, means for carrying carton blanks therethrough, rollers arranged to feed a flattened, tubular, paper-board structure into the machine, cutting mechanism designed to receive and sever sections or pockets from said tubular structure, delivery rolls adapted to receive said pockets and deliver the same upon the passing blanks and means for securing the pockets upon the blanks.

18. The method of forming egg cartons, comprising the cutting of a moving strip of paper board to form a connected series of carton blanks, applying an adhesive material to said strip, spotting pockets on the treated portions of the moving strip, sealing said pockets in planted positions and breaking the leading pocket equipped carton blank from said strip.

19. The method of forming egg cartons, comprising the cutting of a moving strip of paper board to form a connected series of carton blanks, affixing pockets to the moving strip and breaking the leading blank from said strip following the application thereto of said pockets.

20. The method of forming egg cartons consisting in applying pockets to a moving strip of paper board and severing the strip transversely to supply carton blanks therefrom following the application thereto of said pockets.

In testimony whereof, I have signed my name to this specification.

EARL WILLIAM KOESER.